United States Patent
De Vanssay et al.

(10) Patent No.: US 6,226,598 B1
(45) Date of Patent: May 1, 2001

(54) METHOD OF MEASURING THE PROPAGATION TIME OF A SOUND SIGNAL IN A FLUID BY MEANS OF A ZERO-CROSSING OF SAID SOUND SIGNAL

(75) Inventors: Robert De Vanssay, Savigny-sur-Orge; Jérôme Juillard, Paris, both of (FR)

(73) Assignee: Schlumberger Industries, S.A., Montrouge (FR)

( * ) Notice: Subject to any disclaimer, the term of this patent is extended or adjusted under 35 U.S.C. 154(b) by 0 days.

(21) Appl. No.: 09/205,032

(22) Filed: Dec. 4, 1998

Related U.S. Application Data

(63) Continuation of application No. PCT/FR97/01012, filed on Jun. 6, 1997, now abandoned.

(30) Foreign Application Priority Data

Jun. 7, 1996 (FR) .................................................. 96 07189

(51) Int. Cl.$^7$ ....................................................... G01F 1/00
(52) U.S. Cl. ...................... 702/48; 702/45; 73/861.18; 73/861.19; 73/861.27
(58) Field of Search ................................. 702/45–48, 75, 702/79; 73/861.18, 861.19, 861.27, 861.29

(56) References Cited

U.S. PATENT DOCUMENTS

| | | | |
|---|---|---|---|
| 4,028,938 | * 6/1977 | Eck ................................... | 73/861.31 |
| 4,308,754 | * 1/1982 | Pedersen et al. ...................... | 702/48 |
| 4,367,654 | * 1/1983 | Ymker et al. ..................... | 73/861.29 |
| 4,432,243 | * 2/1984 | Lowell et al. .......................... | 702/48 |
| 4,557,148 | * 12/1985 | Akiyama ............................... | 702/48 |
| 5,753,824 | * 5/1998 | Fletcher-Haynes .................... | 702/48 |

* cited by examiner

Primary Examiner—Marc S. Hoff
Assistant Examiner—Bryan Bui
(74) Attorney, Agent, or Firm—Leonard W. Pojunas

(57) ABSTRACT

Measuring the propagation time of a sound signal between two spaced-apart transducers disposed in a fluid flow involves determining the zero-crossing of the signal. Each received sound signal is sampled and digitized, then for each period of the sampled and digitized signal the maximum amplitudes P− and P+ of the two lobes of the period under examination are determined. The ratio of the amplitudes are compared to an ideal amplitude ratio between the maximum amplitudes Pi− and Pi+ of two lobes of a first ideal characteristic period. The first zero-crossing of the characteristic oscillations of the signal is determined. And, as a function of the result of the comparison relative to a threshold value Gs, the period under examination is accepted or ignored as a characteristic period. The zero-crossing thereof is determined or not determined between the two lobes of the characteristic period.

11 Claims, 6 Drawing Sheets

METHOD OF MEASURING THE PROPAGATION TIME OF A SOUND SIGNAL IN A FLUID BY MEANS OF A ZERO-CROSSING OF SAID SOUND SIGNAL

This is a continuation of international application PCT/FR97/01012, filed Jun. 6, 1997, which designated the United States and is now abandoned.

The present invention relates to a method of measuring the propagation time of a sound signal in a fluid flow between a first transducer acting as a transmitter and a second transducer acting as a receiver and situated at a determined distance from the first transducer, the sound signal transmitted by the first transducer being constituted by at least one pulse transmitted at a determined sound frequency Fa, and the sound signal received by the second transducer comprising a series of characteristic oscillations of amplitude that increases initially over several periods, and then deceases over several following periods, the envelope of the characteristic oscillations being bell-shaped, the method consisting in sampling the received sound signal at a sampling frequency Fe, in digitizing the sampled received sound signal, and in seeking the first meaningful zero-crossing of the characteristic oscillations of the received sound signal by analyzing the sampled and digitized received sound signal.

It has been known for many years to measure the flow rate (or the volume) of a fluid flowing along a duct by using the propagation of sound signals transmitted between two sound transducers situated at points that are spaced apart in the flow direction of the fluid. In principle, a sound signal transmitted from the first transducer towards the second transducer is received by the second transducer and the propagation time Td of said sound signal is measured. Similarly, the propagation time Tu of a sound signal transmitted from the second transducer towards the first transducer is also measured on reception of said signal by said second transducer.

In a fluid meter, the flow rate can be obtained by combining a propagation time measurement for each of the two sound signals transmitted between the two points in opposite directions with a measurement of the sound phase shifts induced in each of the sound signals by the propagation of each of them in the flow. European patent application No. 0 426 309 describes an example of such a flow rate measuring system in which the received signal is sampled and converted into digital form, with sound phase shift being measured by performing synchronous detection on the digitized signal.

When measuring the speed of a gas flow in a gas meter that uses two ultrasound transducers, and when the propagation speed of the ultrasound wave depends on the nature of the gas, it is necessary to measure the travel time of the ultrasound wave between the instant at which it is transmitted and the instant at which it is received.

FIG. 2 shows the waveform of a rectangular pulse signal $S_1$ of width T transmitted at an instant $T_O$ by a first ultrasound transducer disposed in the flow of a fluid at a first point, and the waveform of the signal $S_2$ constituting the impulse response as received as an image thereof at an instant $T_1$ by a second ultrasound transducer located in the flow of the fluid at a second point that is distinct from the first point.

The sound signal $S_2$ received by the second transducer is constituted by a series of characteristic oscillations $O_c$ which increase in amplitude over several periods and then decrease, the envelope of the characteristic oscillations being bell-shaped. The characteristic oscillations $O_c$ of the signal $S_2$ are preceded and followed by interference oscillations $O_p$ of small amplitude. To determine the instant $T_1$ at which the characteristic oscillations begin, it is appropriate to identify the first meaningful zero-crossing of the characteristic oscillations $O_c$ of the received sound signal $S_2$.

FIG. 3 is on a larger scale than FIG. 2 and shows an example of the sound signal $S_2$ received as an image of a rectangular pulse $S_1$ transmitted at a determined sound frequency Fa.

To determine the beginning of the characteristic oscillations $O_c$ using a known method, a threshold voltage $V_s$ is set relative to which the level of the received sound signal $S_2$ is compared, with the comparison being performed on a digitized signal obtained after the received analog signal has been sampled, at a sampling frequency Fe that, for example, is a multiple of the sound frequency Fa.

In this case, the instant $T_2$ is identified at which the amplitude of the received signal crosses the threshold voltage $V_s$, and the instant of the preceding (or following) zero-crossing is identified, which instant is then considered as being the starting instant $T_1$ of the characteristic oscillations $O_c$ of the received sound signal $S_2$.

That measurement method can lead to errors whenever the characteristics oscillations $O^c$ of the received sound signal $S_2$ might be amplified to a greater or lesser extent as a function of the nature of the gas. Thus, FIG. 4 shows a curve $S_{21}$ which corresponds to the waveform of a received sound signal for nitrogen ($N_2$) and a curve $S_{22}$ which corresponds to the waveform of a received sound signal for a mixture of carbon dioxide and methane ($CO_2/CH_4$). It can be seen that the curve $S_{21}$ crosses the threshold voltage $V_s$ at an instant $T_4$ which triggers identification of the preceding zero-crossing at an instant $T_3$ which is properly considered as marking the beginning of the characteristic oscillations $O_c$. However, it can be observed that the curve $S_{22}$ which is in phase with the curve $S_{21}$ crosses the threshold voltage $V_s$ at an instant $T_6$ that is later than the instant $T_4$ and that is offset relative thereto by the value of one period $T_R$ in the received signal. The instant $T_5$ is then identified for the curve $S_{22}$ as being the zero-crossing point immediately preceding the threshold crossing at instant $T_6$ and it is then taken into consideration as marking the instant at which the characteristic oscillations $O_c$ of the curve $S_{22}$ begin. Unfortunately, as can be seen in FIG. 4, the curve $S_{22}$ has a negative lobe that merely comes close to the value of the threshold value $V_s$ without reaching or crossing said threshold.

Because of amplification or attenuation in the received signal $S_2$ varying as a function of the nature of the gas, the conventional method of measuring the time of the first zero-crossing in the characteristic oscillations of the received signal can give rise to an error of plus or minus one period that significantly decreases measurement accuracy.

The invention seeks to remedy the above-mentioned drawbacks and to make it possible to reduce the sensitivity of the method of measuring the zero-crossing time of a received sound signal relative to waveform variation in the signal and relative to any external disturbances that may be detected by a simple method of monitoring threshold crossings, and that can give rise to erroneous measurements.

According to the invention, these objects are achieved by a method of measuring the propagation time of a sound signal in a fluid flow between a first transducer acting as a transmitter and a second transducer acting as a receiver and situated at a determined distance from the first transducer, the sound signal transmitted by the first transducer being constituted by at least one pulse transmitted at a determined sound frequency Fa, and the sound signal received by the second transducer comprising a series of characteristic oscillations of amplitude that increases initially over several periods, and then deceases over several following periods, the envelope of the characteristic oscillations being bell-shaped, the method consisting in sampling the received sound signal at a sampling frequency Fe, in digitizing the sampled received sound signal, and in seeking the first meaningful zero-crossing of the characteristic oscillations of the received sound signal by analyzing the sampled and digitized received sound signal, the method being characterized in that in order to seek the first meaningful zero-crossing of the characteristic oscillations of the received sound signal, an ideal characteristic first period is initially defined for determining the first zero-crossing of characteristic oscillations of the received sound signal, with said ideal period being characterized by an ideal amplitude ratio Δ between the maximum amplitudes Pi− and Pi+ of the two lobes of said period, and then for each period of the received sound signal as sampled and digitized, the maximum amplitudes P− and P+ of the two lobes of the period under examination are determined, the ratio of said amplitudes P− and P+ is compared with the ratio of the ideal amplitudes corresponding to the ideal period, and then if the result of the comparison is greater than a threshold value $G_s$, the period under consideration is considered as being an interference period corresponding to noise, whereas if the result of the comparison is less than said threshold value $G_s$, the period under examination is considered as being a characteristic period, in which case the zero-crossing between the two lobes of said characteristic period is determined, which zero-crossing is determined as being the first meaningful zero-crossing of the characteristic oscillations of the received sound signal.

The ideal amplitude ratio Δ between the maximum amplitude Pi− and Pi+ of the two lobes of said ideal period is initially determined for a plurality of different gases at different flow rates on the basis of an average of the ratio between the maximum amplitudes P− and P+ of the characteristic period observed from a recording of the received sound signals.

The amplitude ratio Δ between the maximum amplitudes P− and P+ of the first ideal characteristic period of a received sound signal is almost constant as a function of the nature of the gases and is independent of a gain factor. By selecting a comparison criterion based on said ratio Δ, it is possible to reduce very greatly the dependence of the measurement on the nature of the gas, and thus improve the accuracy and the reliability of measurements.

In a first implementation of the invention, the comparison between the ratio of the amplitudes P− and P+ of the period under examination and the ideal amplitude ratio Δ corresponding to the ideal period is performed by computing a similarity criterion G which is the result of comparison with the threshold value $G_s$ and which is defined as follows:

$$G = \left| \frac{(P-) - \Delta(P+)}{(P-)} \right|$$

In a second implementation of the invention, the comparison between the ratio of the amplitudes P− and P+ of the period under examination and the ideal amplitude ratio Δ corresponding to the ideal period is performed by computing a similarity criterion G which is the result of comparison with the threshold value $G_s$ and which is defined as follows:

$$G = \left| \frac{(P-) - \Delta(P+)}{(P-) - z} \right|$$

where z represents an offset term for making the similarity criterion G slightly dependent on the maximum amplitude P− of the negative lobe of the characteristic period under examination.

In said second implementation, the risks of being able to detect waveforms resembling the similarity criterion or template G which are buried in noise are limited.

In a third implementation of the invention, to further reduce the probability of detecting similar periods of low amplitude, the comparison between the ratio of the amplitudes P− and P+ of the period under examination and the ideal amplitude ratio Δ corresponding to the ideal period is performed by computing a similarity criterion G which is the result of comparison with the threshold value $G_s$ and which is defined as follows:

$$G = \left| \frac{(P-) - \Delta[(P+) - z']}{(P-) - z} \right|$$

where z is an offset term for making the similarity criterion G slightly dependent on the maximum amplitude P− of the negative lobe of the characteristic period under examination, and z' is an offset term for making the similarity criterion G slightly dependent on the maximum amplitude P+ of the positive lobe of the characteristic period under examination.

In order to avoid errors in determining the maximum amplitudes P− and P+ of the two lobes of each period examined, which errors may be due to a phase offset that exists between the received sound signal and the sampling signal, it is possible to use an algorithm for approximating the maximum (in absolute value) on the basis of points sampled in the vicinity of each maximum, in order to obtain better accuracy on the values P− and P+.

Still for the purpose of avoiding such errors, when the received sound signal is repeatable, a plurality of successive measurements are performed respectively on a plurality of consecutive sound signals, with the sampling signal being phase shifted for each sound signal relative to the sound signal under consideration so as to obtain a plurality of sampled points that are offset in the vicinity of the maximum.

In a variant implementation that also makes it possible to reduce the probability of detecting similar periods of low amplitude, two or three computations of the similarity criterion G are preformed for each examined period using different ideal amplitude ratio values close to the predetermined ideal amplitude ratio and differing therefrom by no more than 10%, and the period under examination is taken to be a characteristic period if the computed similarity criterion G is always less than the threshold value $G_s$.

To determine the threshold value $G_s$ for the similarity criterion G, and also to determine the value of the offset term z, an array of first curves is initially drawn for different gases at different flow rates, varying the offset between the sampling frequency Fe and the received sound signal and applying a gain factor that varies over the range 0.45 to 1.5, said curves representing the maximum values of the similarity criterion G for the observed characteristic periods, and a second array of curves is similarly drawn representing the values of the minimum of the similarity criterion G for observed interference periods, as a function of different possible values for the offset term z, and a threshold value $G_s$ and an offset term value z are selected as a function of the safety margin available in the intermediate zone between the array of first curves and the array of second curves.

By way of example, the value of the threshold $G_s$ may lie in the range 0.7 V and 1.7 V, and the value of the offset term z may lie in the range 0.21 V and 0.25 V.

The invention is advantageously applicable to a method of measuring the flow speed of a fluid between two transducers disposed at spaced-apart measurement points in the flow direction of the fluid, in which the value of the flow speed to be measured is obtained by combining respective propagation time measurements for each of two sound signals transmitted between the two points in opposite directions by the transducers, with sound phase shifts being measured as respectively induced in each of the sound signals by the propagation of said sound signals in the flow, the respective propagation times being measured for each of the two sound signals transmitted between the two measurement points by using the method of the present invention.

Other characteristics and advantages of the invention appear from the following description of particular embodiments, given with reference to the accompanying drawings, in which.

Figure 1:
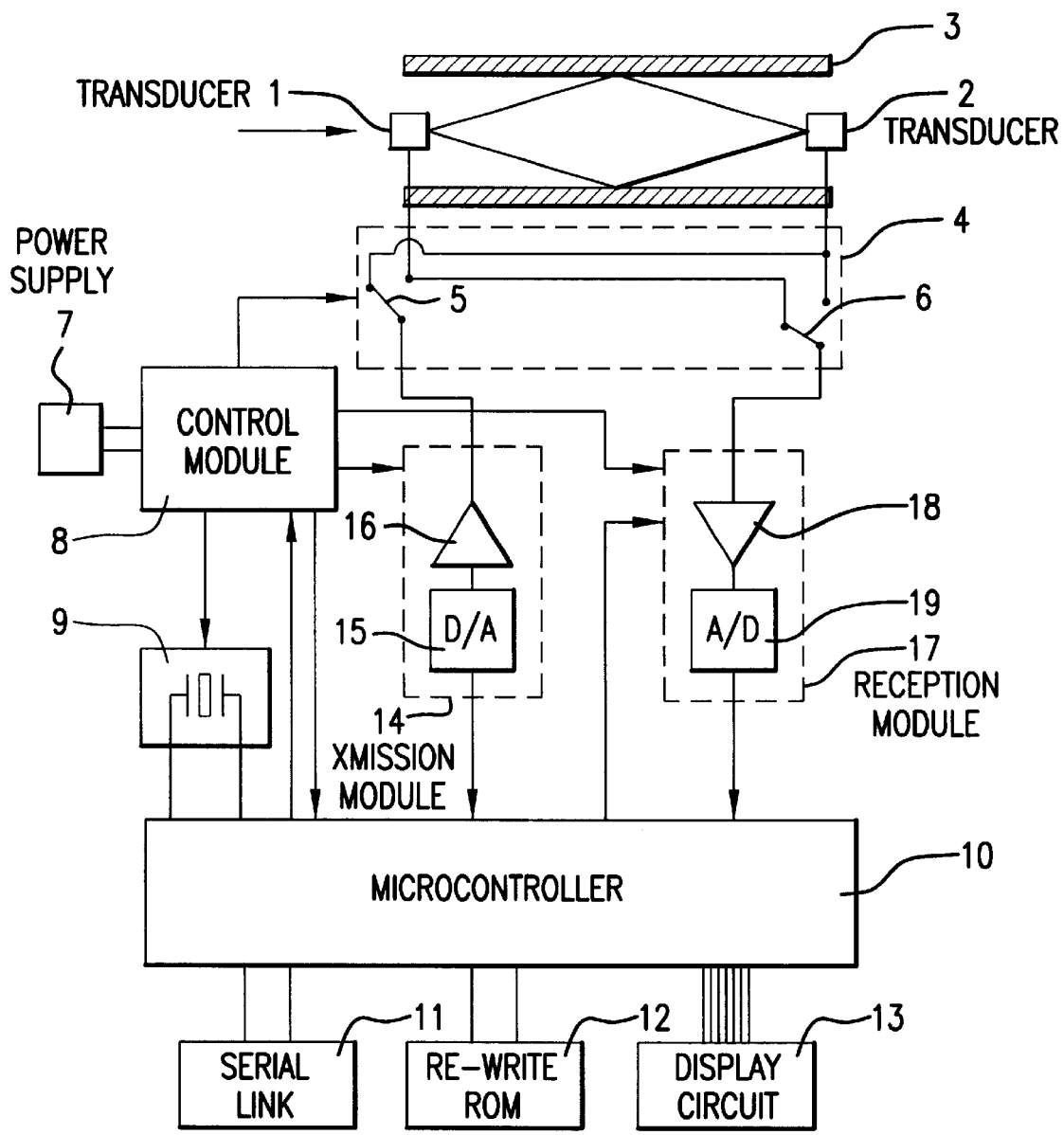
FIG. 1 is an overall block diagram of prior art gas metering apparatus to which the present invention is applicable.
Figure 2:
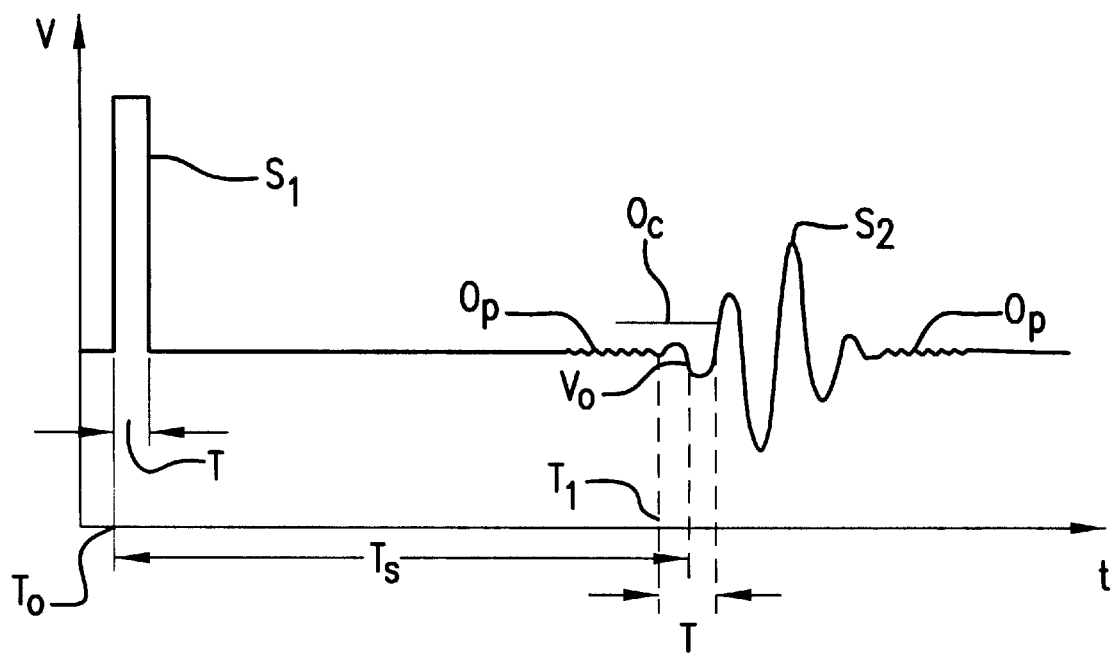
FIG. 2 is a graph showing the principle of a known method for determining the propagation time of a sound signal in a fluid medium.

Various types of electronic circuit can be used to meter a fluid by a measurement method using ultrasound to measure the flow speed of the fluid. FIG. 1 is a block diagram of one example of such an electronic circuit which is associated with two ultrasound transducers 1 and 2 that are disposed at a distance apart from each other in a duct 3 along which there flows a fluid such as a gas. The two transducers 1 and 2 are connected to a switch block 4 which includes two switches 5 and 6 enabling each transducer to be used in alternation as a transmitter and as a receiver. A transmitter module 14 and a receiver module 17 are connected respectively to the switches 5 and 6 of the switch block 4. The transmitter module 4 comprises an operational amplifier 16 and a digital-to-analog converter 15. The receiver module 17 comprises at least one amplifier 18 and an analog-to-digital converter 19 which simultaneously samples and digitizes the received signal. An electrical power supply 7 and an electrical power supply control module 8 are connected in particular to the transmission module 14 and to the reception module 17 and also to the switch block 4 and to a microcontroller 10. The microcontroller 10 includes, in particular, a crystal clock 9, an arithmetic and logic unit, read/write and read-only memory circuits, and is capable of co-operating with a display circuit 13, a re-writable read-only memory 12, and an RS 232 type serial link 11.

Gas meters for each customer of a distribution network need to be simultaneously accurate, reliable, and as cheap as possible. These constraints make it essential to avoid using components that are expensive, to use small, long-duration power supply batteries of medium capacity only, for safety reasons, and to perform computations using a measurement method that ensures both high accuracy and high reliability, while remaining sufficiently simple to be economical in energy terms.

The measurement method of the invention as explained below is thus advantageously applied to measurement apparatus for measuring the flow speed of a gaseous fluid, suitable for metering consumption of said fluid, by implementing two ultrasound transducers that are disposed at a distance from each other within a duct in the flow direction of the fluid. By way of example, the ultrasound transducers may operate at a sound frequency Fa of about 40 kHz and the received sound signals may advantageously be sampled at a frequency Fe of 320 kHz, i.e. a frequency that is eight times greater than the frequency Fa.

The sampling frequency Fe is advantageously equal to a multiple of the sound frequency Fa. Nevertheless, the frequency Fe may also have some other value. When the value of Fe is too low (whether or not it is a multiple of Fa), it is preferable, for example, to use an approximation algorithm in the vicinity of the maximum (in absolute value) of each period of the sound signal, or indeed to perform a plurality of successive measurements with the sampling signal being phase shifted on each occasion relative to the sound signal under consideration, in order to obtain greater accuracy concerning the values of the maximum amplitudes (in absolute value). These methods are described below.

When the values of Fe are high enough, the use of such methods is not necessary.

The sound signal transmitted by its transducer is constituted, for example, by a pulse transmitted at the determined sound frequency Fa. This example may be rectangular, for example. It is also possible to transmit a plurality of pulses.

In general, the flow rate of the fluid in a duct can be written as follows:

$$\Phi = (SL/2)(Tu - Td)/Tu.Td$$

where:

S is the mean section of the passage provided for the flow between the two sound transducers;

L is the distance between the transducers;

Td is the propagation time of the sound signal transmitted in the flow direction from the first transducer (the upstream transducer) until said sound signal is received by the second transducer (downstream transducer); and Tu is the propagation time of the sound signal transmitted in the direction opposite to the flow from the second transducer until said sound signal is received by the first transducer (the upstream transducer).

If this flow rate measurement also makes use of a measurement of the sound phase shift induced in each sound signal by the propagation of each sound signal transmitted by the transducers into the flow, then the flow rate of the fluid in a duct can be written as follows:

$$\Phi = (SL/4\pi Fa)(2\pi[Fa(Tu-Td)]+(\phi d-\phi u))/Tu.Td$$

where S, L, Td, and Tu have the same meanings as are given above, and ød and øu represent respectively the sound phase shifts induced in each of the sound signals because of the propagation of said signals, and Fa represents the frequency of said sound signals.

More particularly, the propagation times Tu and Td can be written respectively as follows:

$$Tu=L/(c-v)$$

$$Td=L/(c+v)$$

where c and v represent respectively the propagation speed of the sound signal and the speed of the gas.

For a given composition of gas, since the propagation speed c depends mainly on temperature which varies little while flow rate measurements are taking place, the term Tu.Td also varies little and this term can be recomputed at a relatively low frequency. However, once absolute propagation time is being measured, then the accuracy obtained on said measurement carries through directly into the accuracy with which flow rate is measured. It is thus essential to avoid having an offset in this measurement.

For example, if the accuracy required on flow rate is 1%, then the accuracy with which propagation time is measured must be close to 0.5%, which correspond to an error of less than 2 µs on propagation times using ordinary gases and ordinary lengths L between two transducers (e.g. L=150 mm and the gas is methane).

In a "zero-crossing method" of measuring the propagation times Tu and Td, the propagation times (Tu pz) and (Td pz) of sound signals transmitted by each of the transducers are measured until a zero-crossing has been detected, and the real propagation times Tu and Td are deduced therefrom where Tu=(Tu pz–To) and Td=(Td pz–To) where To is a constant to be subtracted in order to obtain the propagation time in the gas, with To depending only on the nature of the transducers and of the electronic circuits.

Figure 3B:
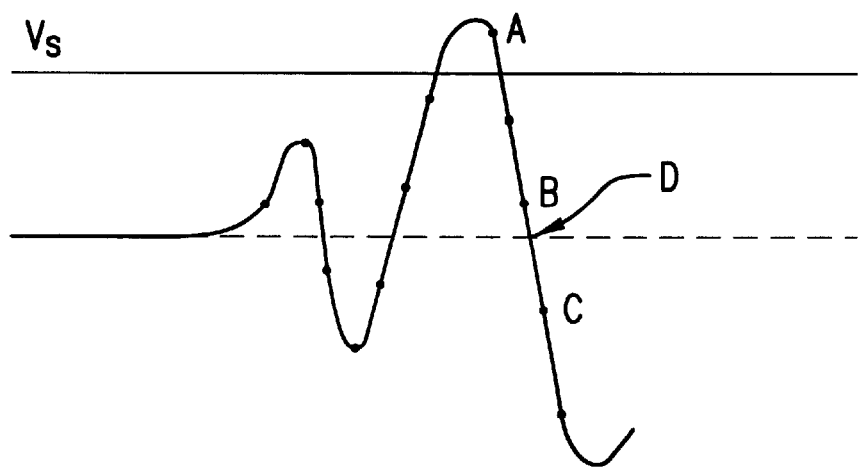
FIG. 3b is a graph analogous to FIG. 3a showing how operations are performed on a sampled signal in a known method for determining the propagation time of a sound signal by means of zero-crossings.
Figure 3A:
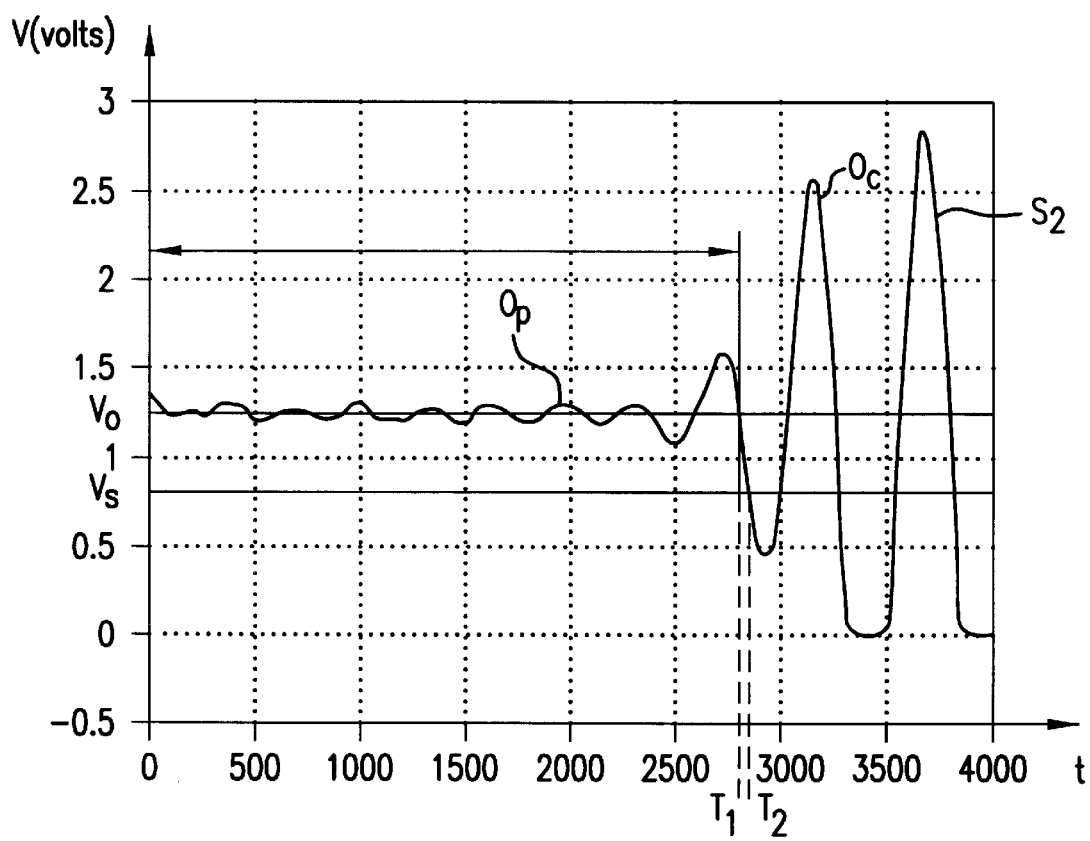
FIG. 3a is a graph on a larger scale showing a portion of FIG. 2 for explaining the principle of a known method for determining the propagation time of a sound signal by comparing the received signal with a threshold value.

FIG. 3a shows the zero-crossing measurement method performed on each received ultrasound signal in a known method, when using apparatus of the kind shown in FIG. 1.

The received signal is amplified by the amplifier 18 which has given gain, and is then sampled and digitized simultaneously in the converter 19. In the example under consideration, sampling is performed at a frequency Fe which may be equal to 8 Fa, for example, i.e. at 320 kHz if Fa is equal to 40 kHz.

The instructions enabling measurements to be performed, as contained in a read-only memory of the microcontroller 10, enable the amplitude values of the received signal at the sampled points, which values are stored in a read/write memory, to be compared with a predetermined value corresponding to a threshold $V_s$, and a search is performed amongst the amplitude values of the sampled points for the first point following A which has an amplitude value greater than the threshold.

Starting from this point, the next zero-crossing is sought in the curve representing the ultrasound signal. To do this, two consecutive sample points B and C are determined which lie on either side of the point where the amplitude of the curve passes through the value zero, and linear interpolation is performed between B and C to determine the point D, and thus to measure the zero-crossing time Tpz.

Figure 4:
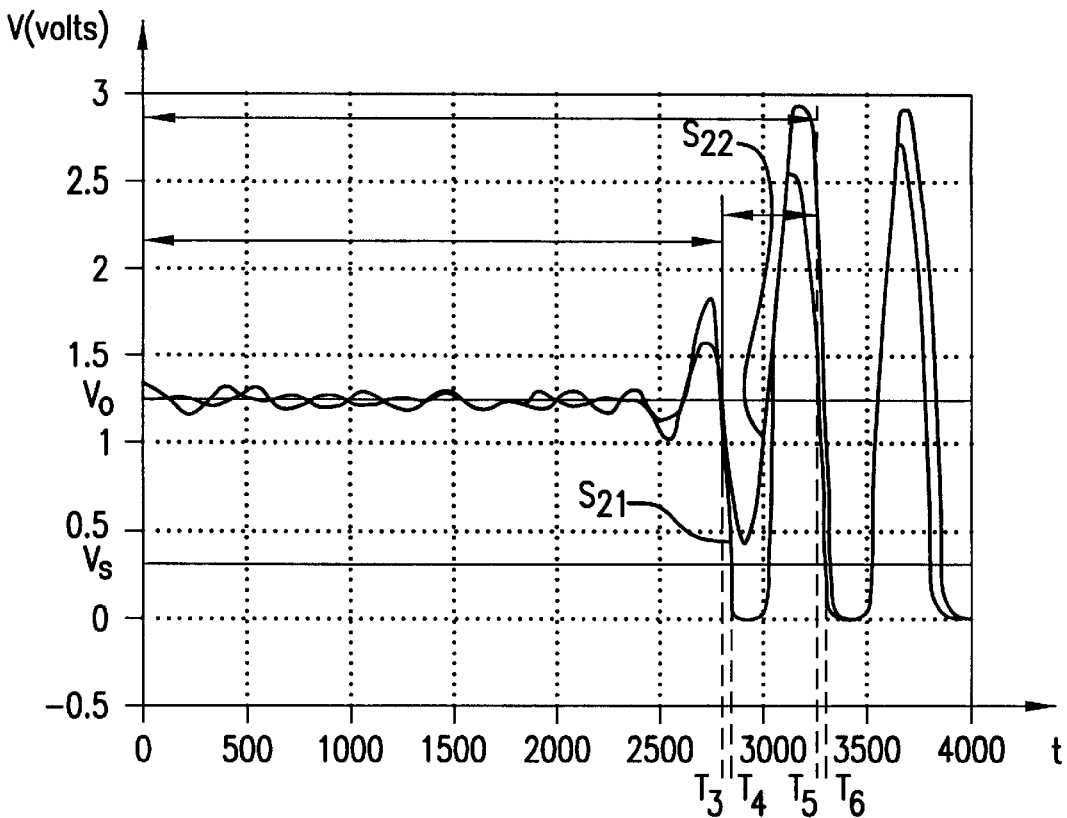
FIG. 4 shows a set of two graphs analogous to that of FIG. 3a showing the risk of error in a known method of determining the propagation time of a sound signal relying on comparing received signals with a threshold value.

In a variant embodiment, as shown in above-described FIGS. 3 and 4, it is also possible to search for the last zero-crossing of the curve representing the ultrasound signal prior to said curve passing through the threshold.

The present invention seeks to improve that method of determining a signal propagation time by measuring zero-crossing times.

As mentioned above with reference to FIGS. 3 and 4, merely comparing the voltage amplitude values at the sampled points of a received sound signal with a threshold voltage value $V_s$ can give rise to errors in determining the zero-crossing time Tpz, and thus in the propagation time of the sound signal. Although the zero-crossing time $T_3$ for curve $S_{21}$ relating to the signal corresponding to a gas constituted by nitrogen is correct in FIG. 4, the zero-crossing time $T_5$ for the curve $S_{22}$ relating to the signal corresponding to a gas constituted by a mixture of carbon dioxide and of methane is incorrect and is too great.

The method of the invention makes it possible to avoid that kind of error, and in general to reduce the sensitivity of the zero-crossing time measurement method to variations in waveform and to possible external disturbances which, if detected, would give rise to measurement errors.

According to the invention, when seeking the first meaningful zero-crossing of the characteristic oscillations $O_c$ of the received sound signal $S_2$, an ideal first characteristic period is initially defined which is distinct from low amplitude interference oscillations constituting noise, and which determines the first zero-crossing of the characteristic oscillations $O_c$ of the received signal $S_2$. This ideal period is characterized by an amplitude ratio Δ between the amplitudes of the maximum values Pi– and Pi+ of the negative and positive lobes of said ideal period.

On receiving a sound signal $S_2$ to be analyzed, which signal is sampled and digitized in conventional manner, the maximum amplitude values P– and P+ of the negative and positive lobes of the period under examination are determined for each period of the received sound signal as sampled and digitized. To do this, there is no need to examine all of the points sampled in the period, and the maximum values (in absolute values) P– and P+ of the negative and positive lobes of the period under examination can be determined by searching merely in the vicinities of these extreme values.

Nevertheless, it should be observed that a phase offset exists between the received sound signal and the sampling signal. Thus, as a function of the phase offset that exists, the sampled point will represent more or less faithfully the maximum values (in absolute values) P– and P+ of the negative and positive lobes.

To remedy this problem, it is possible to use an algorithm for approximating the maximum (in absolute value) on the basis of the point sampled in the vicinity of the maximum in order to obtain an estimate of the real value of said maximum regardless of the phase offset that exists between the received sound signal and the sampling signal. For example, it is possible to use a conventional polygon approximation algorithm. The above-raised problem can also be solved by increasing the sampling frequency.

Nevertheless, when the method of the invention is implemented in a fluid meter that runs on batteries, it is necessary to reduce the power consumption of the method to be as low as possible, and this requirement is not compatible with increasing the sampling frequency.

Also, a high sampling frequency requires the use of a clock that is more expensive. A solution that is advantageous for solving the above-mentioned problem while complying with constraints on power consumption and on cost consists (when the sound signal is repeatable over time for a plurality of successive measurements) in performing a plurality of successive measurements respectively on a plurality of consecutive sound signals transmitted in the same propagation direction while phase shifting the sampling signal relative to the sound signal each time a new measurement is made so as to obtain from the various measurements a plurality of sample points that are offset in the vicinity of the maximum amplitudes P− and P+ of the negative and positive lobes. For example, the first measurement may be performed by sampling the received sound signal normally, then the second measurement can be performed on the second sound signal by shifting the sampling signal relative to said second sound signal by a determine value ½ Fe.

It is thus possible to perform a plurality of successive phase shifts (each value (1/n)Fe for n phase shifts) on the second sound signal and the subsequent sound signals so as to obtain more sample points in the vicinity of the maxima, thus achieving even greater accuracy concerning the maximum amplitudes P− and P+. It is also advantageous to combine the use of an algorithm for approximating the maximum (in absolute value) with said solution so as to increase accuracy even further.

Thereafter, a comparison is performed between the ratio of said maximum value amplitudes P− and P+ and the corresponding ratio Δ for an ideal period.

If the result of the comparison is greater than a threshold value $G_s$, it is assumed that the period under examination is an interference period corresponding to noise, and analysis continues on the following period.

If the result of the comparison is less than the threshold value $G_s$, it is assumed that the period under examination is a characteristic period.

It is then possible to determine in reliable manner the zero-crossing associated with the period under examination. This zero-crossing considered as the first meaningful zero-crossing of the characteristic oscillations of the received sound signal may advantageously be the zero-crossing situated between the positive and negative lobes of the characteristic period.

Figure 5:
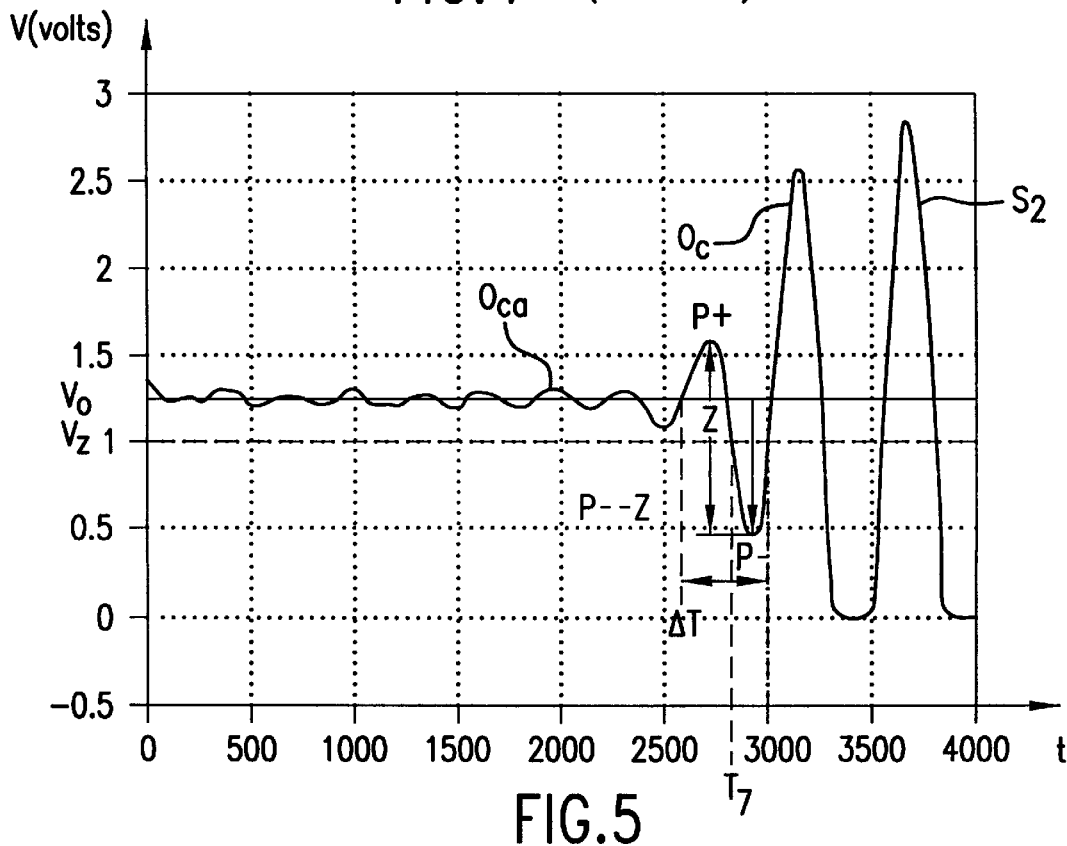
FIG. 5 is a graph showing the principle implemented by the method of the invention for determining the propagation time of a sound signal in a fluid medium.

FIG. 5 shows a first characteristic oscillation $O^{ca}$ for period ΔT with a positive lobe whose amplitude has a maximum value P+ and a negative lobe whose amplitude has a maximum value P−. The zero-crossing associated with this period ΔT of a first characteristic oscillation $O_{ca}$ defines a zero-crossing time corresponding to a time $T_7$.

The ratio between the values of the maximum amplitudes P− and P+ of the two lobes of a period under examination of the received sound signal constitutes a comparison criterion that is independent of the nature of the gas. Thus, aging of the electronics can give rise to changes of gain without that having any effect on this ratio between the maximum amplitudes P− and P+. The waveform of the received sound signal can thus be recognized in simple manner, thereby limiting power consumption, since the comparison is performed solely between the maximum amplitudes P− and P+ of the lobes and an ideal amplitude ratio Δ between the maximum amplitudes P− and P+ of the two lobes of an ideal characteristic period.

The ideal amplitude ratio Δ is initially determined from an average of a plurality of different gases and at different flow rates, from the ratios between the maximum amplitudes P− and P+ of the characteristic periods observed by recording the received sound signals.

In a particular implementation, comparison between the ratio of the amplitudes P− and P+ for the period under examination and the corresponding amplitude ratio of the ideal period is performed by computing a similarity criterion G which constitutes the result of comparisons relative to the threshold value $G_s$, and which is defined as follows:

$$G = \left| \frac{(P-) - \Delta(P+)}{(P-)} \right|$$

By performing comparisons by taking account of the maximum amplitude ratios of the lobes of a period of the received sound signal, the reference ideal amplitude ratio Δ is unaffected by the nature of the gas or the gain of the chain that amplifies the received signal. This contributes to facilitating measurement.

Nevertheless, it can happen that interference periods of the signal constituted by noise include waveforms that are similar to those defined by the comparison criterion G. To make the detection of characteristic periods less sensitive to the risk of taking into account similar waveforms buried in noise and not constituting a first period $O_{ca}$ of the characteristic oscillations $O_c$ in the received signal, the similarity criterion can be made to depend slightly on the amplitude P−.

Thus, in another particular implementation, the comparison between the ratio of the amplitudes P− and P+ of the period under examination and the amplitude ratio corresponding to the ideal period is performed by calculating a similarity criterion G which constitutes the result of comparison with the threshold value $G_s$ and which is defined as follows:

$$G = \left| \frac{(P-) - \Delta(P+)}{(P-) - z} \right|$$

where z represents an offset term for making the similarity criterion G slightly dependent on the amplitude of the maximum value (P−) of the negative lobe of the characteristic period under examination.

In this case, the denominator of the criterion G is made much smaller when the amplitude P− is close to the offset term z. If the offset term z has a value that is slightly greater than the maximum amplitude of noise (e.g. about 0.20 V to 0.25 V), this makes it possible to reject interference periods of the received signal more quickly.

To determine the value of $G_s$ which needs to be compared with the similarity criterion G. and the value of the offset term z, an array of first curves is drawn representing the maximum values of the similarity criterion G for observed characteristic periods, and an array of second curves is drawn representing the minimum values of the similarity criterion G for the observed interference periods, as a function of various possible values for the offset term z, and the threshold value $G_s$ is selected, as is the value for the offset term z by selecting the threshold value $G_s$ and the value of the offset term z as a function of the safety margin available in the intermediate zone between the array of first curves and the array of second curves.

Figure 6:
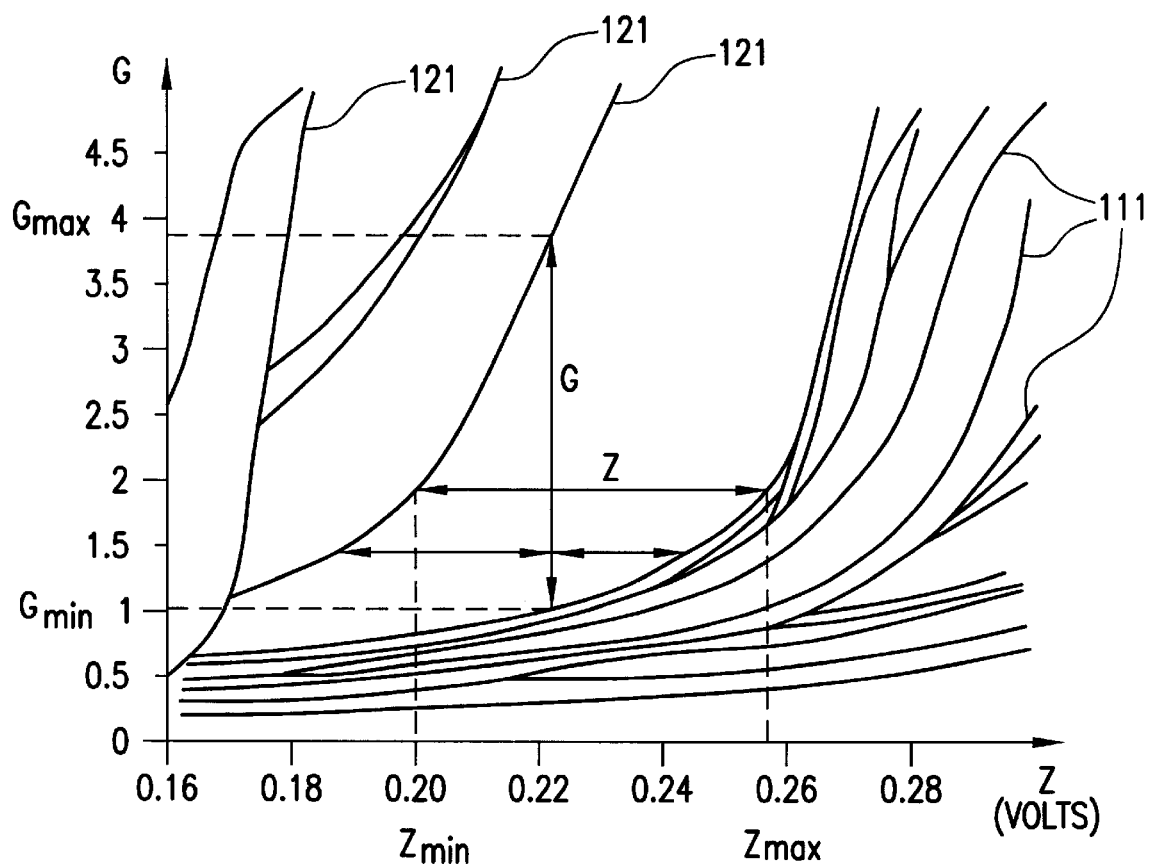
FIG. 6 is a graph showing families of curves enabling parameter values to be selected that are suitable for implementing the method of the invention.

By way of example, the families of curves 111 and 121 in FIG. 6 were obtained by varying the offset between the sampling frequency and the signal and by applying a gain factor varying over the range 0.45 to 1.5, with the gases taken into account being methane and a mixture comprising 20% carbon dioxide and 80% nitrogen, measurements being performed at flow rates lying in the range zero to 7 m³/hour.

The arrays of curves 111 and 121 make it possible to select values for the offset term z and for the threshold value $G_s$ as a function of the safety margin desired on these values. With reference to FIG. 6, it can be seen that it is possible to select for $G_s$ a value lying, for example, between about 0.7 V and 1.7 V, and for the offset term z, a value lying, for example, between 0.21 V and 0.25 V.

For example, if the following selections are made $G_s=2$ and $z=0.22$ V, then the safety margin on z lies in the range 0.20 V and 0.25 V while the safety margin for $G_s$ lies in the range 1 to 4. In practice, in this example, a period under examination will be considered as being characteristic if $G<G_s=1.5$.

Other variant implementations make it possible to further increase the security and the reliability of the method.

Thus, in a particular implementation, comparing the ratio of the amplitudes P− and P+ for the period under examination and the ratio of amplitudes corresponding to the ideal period is performed by computing a similarity criterion G which constitutes the result of comparison with the threshold value $G_s$, and which is defined as follows:

$$G = \left| \frac{(P-) - \Delta[(P+) - z']}{(P-) - z} \right|$$

where z represents an offset term for making the similarity criterion G slightly dependent on the amplitude of the maximum value (P−) of the negative lobe of the characteristic period under examination, and z' represents an offset term for making the similarity criterion G slightly dependent on the amplitude of the maximum value (P+) of the positive lobe of the characteristic period under examination.

This makes it possible to reduce the sensitivity to similarity periods of low amplitude and, without significantly increasing the complexity of computation, it also makes it possible to reduce the gain of the amplifier chain to values as low as 0.35, thereby saving energy.

In another variant, and regardless of the formula selected for the similarity criterion G, two or three computations of the similarity criterion G are performed for each period under examination using different values of the amplitude ratio Δ close to the predetermined ideal amplitude ratio and differing therefrom by no more than 10%, and the period under examination is considered as being a characteristic period if the computed similarity criterion G is in all cases less than the threshold value $G_s$.

Figure 7:
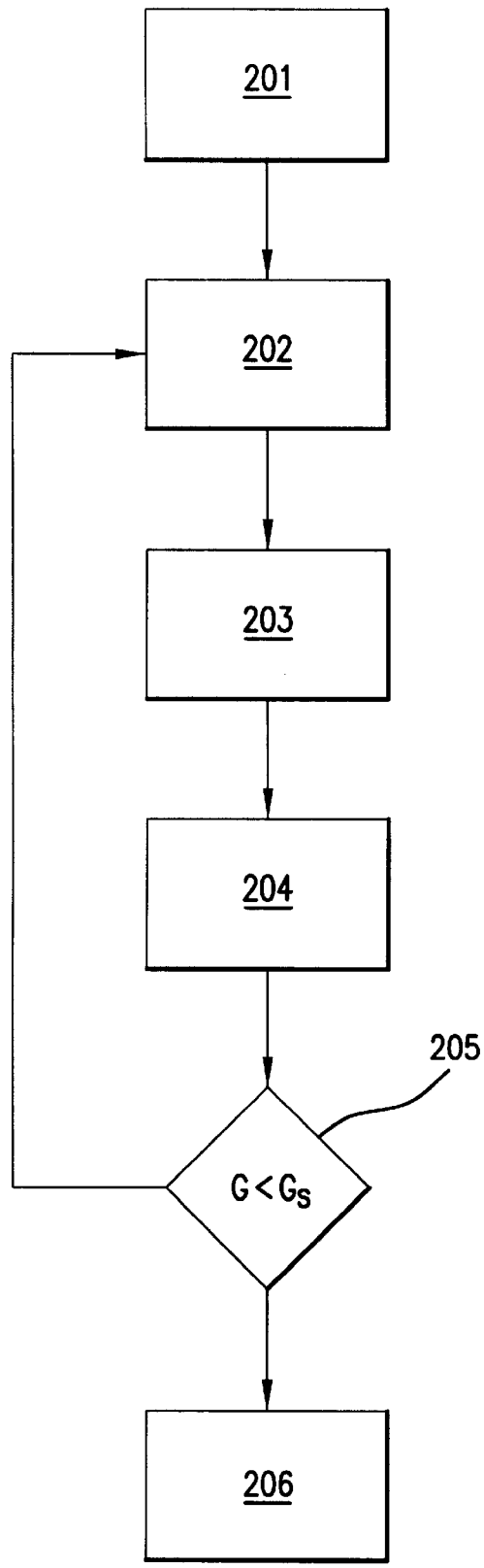
FIG. 7 is a flow chart showing an example of the various steps in the method of the invention.

FIG. 7 is a flow chart showing an example of the process implemented by the method of the invention.

If sampling is considered at a frequency Fe, e.g. 320 kHz, which is eight times the sound frequency Fa of the transducers, then the sampled signal will have eight points per period of the received signal.

Insofar as the received sound signal has the form of periodic oscillations, it is known where excessive minima and maxima are to be found, thereby avoiding the need to examine all of the sampled points.

Thus, after the initialization stage 201, the method begins in a step 202 by seeking the next local minimum (amplitude P−). During this step 202, a similarity criterion G is used that includes an offset term z, and a local first minimum is retained only if the amplitude P− is greater (in absolute value) than the offset term z. When this first local minimum has been found, the method moves on to step 203 which consists in searching in the vicinity of one half-period T/2 from the preceding minimum, for the maximum amplitude period P+.

At the next step 204, the value of the similarity criterion G is computed using the previously found values for the minimum P− and the maximum P+ of the period under examination which has at least a minimum whose absolute value is greater than the offset term z.

In step 205, a comparison test is performed between the value of the computed criterion G and the threshold value $G_s$.

If $G \geq G_s$, for the period under examination, then it is considered that the period is an interference period and the method returns to step 202 in which it seeks a new local minimum.

If $G < G_s$, for the period under examination, then the period is considered as being a characteristic period and the method moves on to a step 206 for determining the next zero-crossing in the amplitude of the received signal which will constitute the zero-crossing situated between the local maximum P+ and the local minimum P− and will thus be the true starting point of characteristic oscillations $O_c$ in the received sound signal.

The same process is repeated a few instants later for a new measurement for determining the propagation time of an ultrasound signal.

What is claimed is:

1. A method of measuring the propagation time of a sound signal in a fluid flow between a first transducer acting as a transmitter and a second transducer acting as a receiver and situated at a determined distance from the first transducer, the sound signal transmitted by the first transducer being constituted by at least one pulse transmitted at a determined sound frequency Fa, and the sound signal received by the second transducer comprising a series of characteristic oscillations of amplitude that increases initially over several periods, and then decreases over several following periods, the envelope of the characteristic oscillations being bell-shaped, the method consisting in sampling the received sound signal at a sampling frequency Fe, in digitizing the sampled received sound signal, and in seeking the first meaningful zero-crossing of the characteristic oscillations of the received sound signal by analyzing the sampled and digitized received sound signal, wherein in order to seek the first meaningful zero-crossing of the characteristic oscillations of the received sound signal, an ideal characteristic first period is initially defined for determining the first zero-crossing of characteristic oscillations of the received sound signal, with said ideal characteristic first period being characterized by an ideal amplitude ratio Δ between the maximum amplitudes Pi− and Pi+ of the two lobes of said ideal characteristic first period, and then for each period of the received sound signal as sampled and digitized, the maximum amplitudes P− and P+ of the two lobes of the period under examination are determined, a ratio of said maximum amplitudes P− and P+ is compared with the ratio of the ideal amplitudes corresponding to the ideal period, and then if the result of the comparison is greater than a threshold value $G_s$, the period under consideration is considered as being an interference period corresponding to noise, whereas if the result of the comparison is less than said threshold value $G_s$, the period under examination is considered as being a characteristic, in which case the zero-crossing between the two lobes of said characteristic period is determined, which zero-crossing is determined as being the first meaningfuil zero-crossing of the characteristic oscillations of the received sound signal.

2. A method according to claim 1, characterized in that the ideal amplitude ratio Δ between the maximum amplitude Pi− and Pi+ of the two lobes of said ideal period is initially determined for a plurality of different gases at different flow rates on the basis of an average of the ratio between the maximum amplitudes P− and P+ of the characteristic period observed from a recording of the received sound signals.

3. A method according to claim 1, characterized in that the comparison between the ratio of the amplitudes P− and P+ of the period under examination and the ideal amplitude ratio Δ corresponding to the ideal period is performed by computing a similarity criterion G which is the result of comparison with the threshold value $G_s$ and which is defined as follows:

$$G = \left| \frac{(P-) - \Delta(P+)}{(P-)} \right|.$$

4. A method according to claim 1, characterized in that the comparison between the ratio of the amplitudes P− and P+ of the period under examination and the ideal amplitude ratio Δ corresponding to the ideal period is performed by computing a similarity criterion G which is the result of comparison with the threshold value $G_s$ and which is defined as follows:

$$G = \left| \frac{(P-) - \Delta(P+)}{(P-) - z} \right|$$

where z represents an offset term for making the similarity criterion G slightly dependent on the maximum amplitude P− of the negative lobe of the characteristic period under examination.

5. A method according to claim 4, characterized in that to determine the threshold value $G_s$ for the similarity criterion G, and also to determine the value of the offset term z, an array of first curves (111) is initially drawn for different gases at different flow rates, varying the offset between the sampling frequency Fe and the received sound signal and applying a gain factor that varies over the range 0.45 to 1.5, said curves representing the maximum values of the similarity criterion G for the observed characteristic periods, and a second array of curves (121) is similarly drawn representing the values of the minimum of the similarity criterion G for observed interference periods, as a function of different possible values for the offset term z, and a threshold value $G_s$ and an offset term value z are selected as a function of the safety margin available in the intermediate zone between the array of first curves (111) and the array of second curves (121).

6. A method according to claim 4, characterized in that the value of the threshold $G_s$ lies in the range 0.7 V and 1.7 V, and the value of the offset term z lies in the range 0.21 V and 0.25 V.

7. A method according to claim 1, characterized in that the comparison between the ratio of the amplitudes P− and P+ of the period under examination and the ideal amplitude ratio Δ corresponding to the ideal period is performed by computing a similarity criterion G which is the result of comparison with the threshold value $G_s$ and which is defined as follows:

$$G = \left| \frac{(P-) - \Delta[(P+) - z']}{(P-) - z} \right|$$

where z is an offset term for making the similarity criterion G slightly dependent on the maximum amplitude P− of the negative lobe of the characteristic period under examination, and z' is an offset term for making the similarity criterion G slightly dependent on the maximum amplitude P+ of the positive lobe of the characteristic period under examination.

8. A method according to claim 1, characterized in that to determine the maximum amplitudes P− and P+ of the two lobes of each period under examination with greater accuracy, an approximation algorithm is used for approximating the maximum (in absolute value) on the basis of points sampled in the vicinity of each maximum.

9. A method according to claim 1, characterized in that to determine the maximum amplitudes P− and P+ of the two lobes of each period under examination with greater accuracy, a plurality of successive measurements are performed on a plurality of respective consecutive sound signals with the sampling signal being offset for each sound signal relative to the sound signal under consideration, so as to obtain after said various measurements, a plurality of sample points offset in the vicinity of the maximum amplitudes.

10. A method according to claim 1, characterized in that for each period under examination, two or three computations of the similarity criterion G are performed with different ideal amplitude ratio values Δ in the vicinity of the predetermined ideal amplitude ratio, and departing therefrom by no more than 10%, and in that the period under examination is considered as being a characteristic period if the computed similarity criterion G is in all cases less than the threshold value $G_s$.

11. A method of measuring the flow speed of a fluid between two transducers disposed at spaced-apart measurement points in the flow direction of the fluid, in which the value of the flow speed to be measured is obtained by combining respective propagation time measurements for each of two sound signals transmitted between the two points in opposite directions by the transducers, with sound phase shifts being measured as respectively induced in each of the sound signals by the propagation of said sound signals in the flow, the method being characterized in that the respective propagation times are measured for each of the two sound signals transmitted between the two measurement points by using the method according to claim 1.

* * * * *